United States Patent
Rowley

[11] Patent Number: 5,833,279
[45] Date of Patent: Nov. 10, 1998

[54] CROSSLINKED POLYETHYLENE TUBING ENDS

[76] Inventor: William W. Rowley, 35 Wilding Chase, Chagrin Falls, Ohio 44022

[21] Appl. No.: 774,235

[22] Filed: Dec. 27, 1996

Related U.S. Application Data

[60] Division of Ser. No. 588,713, Jan. 19, 1996, Pat. No. 5,622,670, which is a continuation-in-part of Ser. No. 327,028, Oct. 21, 1994, Pat. No. 5,527,503, which is a continuation-in-part of Ser. No. 62,848, May 14, 1993, abandoned.

[51] Int. Cl.⁶ .................................................. F16L 55/00
[52] U.S. Cl. .................... 285/148.19; 285/332; 285/354; 285/423
[58] Field of Search ................................ 285/423, 332, 285/332.1, 332.2, 332.3, 334.4, 919, 354, 125, 237, 148.19; 138/109, 177

[56] References Cited

U.S. PATENT DOCUMENTS

| | | | |
|---|---|---|---|
| 1,811,277 | 6/1931 | Mosley | 285/237 X |
| 3,013,310 | 12/1961 | Foster et al. | 285/423 X |
| 3,719,209 | 3/1973 | Rush | 285/354 X |
| 4,014,568 | 3/1977 | Carter et al. | 285/423 X |
| 4,039,212 | 8/1977 | Skarud | 285/253 |
| 4,140,739 | 2/1979 | Cotten | 264/138 |
| 4,209,597 | 6/1980 | Bremholt | 285/423 X |
| 4,264,490 | 4/1981 | Berejka | 285/423 X |
| 4,316,870 | 2/1982 | Rowley | 264/296 |
| 4,342,800 | 8/1982 | Changani | 428/36 |
| 4,343,864 | 8/1982 | Berejka | 285/423 X |
| 4,446,084 | 5/1984 | Rowley | 264/40.6 |
| 4,525,136 | 6/1985 | Rowley | 425/384 |
| 4,614,208 | 9/1986 | Skarelius | 138/103 |
| 4,690,632 | 9/1987 | Carrow | 285/423 X |
| 4,783,303 | 11/1988 | Imgram | 264/535 |
| 4,991,876 | 2/1991 | Mulvey | 285/354 X |
| 5,364,135 | 11/1994 | Anderson | 285/354 X |

FOREIGN PATENT DOCUMENTS

| | | | |
|---|---|---|---|
| 033587 | 8/1981 | European Pat. Off. | |
| 2838731 | 3/1980 | Germany | 285/423 |
| 745847 | 3/1956 | United Kingdom | 285/423 |
| 8401988 | 5/1984 | WIPO . | |
| 8503521 | 8/1985 | WIPO . | |

*Primary Examiner*—Dave W. Arola
*Attorney, Agent, or Firm*—Oldham & Oldham, Co., L.P.A.

[57] ABSTRACT

A unitary molded crosslinked polyethylene tubular connector and method for forming the connector with various end configurations (e.g., molded, belled) is described). The process combines the ease of thermoplastic processing combined with the desirable physical properties of a thermoset. The connector is suitable as a replacement for copper tubes with associated fittings as well as polybutylene tubing.

12 Claims, 9 Drawing Sheets

CROSSLINKED POLYETHYLENE TUBING ENDS

This is a divisional of application Ser. No. 08/588,713 filed on 19 Jan. 1996, now U.S. Pat. No. 5,622,670, which is a continuation-in-part of Ser. No. 08/327,028 filed 21 Nov. 1994, now U.S. Pat. No. 5,527,503 which is a continuation-in-part of Ser. No. 08/062,848 filed 14 May 1993, now abandoned.

TECHNICAL FIELD

The invention described herein pertains generally to a method for processing polyethylene tubing ends, e.g., belling at least one polymer tubing end without compromising wall thickness, thereby enabling the work piece to be suitable for plumbing applications or fabricating at least one nose cone configurations out of the tubing walls or processing one or both ends of the tubing using the technology described in this application, or combinations thereof. The crosslinking can occur either before fabricating processing or subsequent to, depending upon the integral strength required at the tubing ends.

BACKGROUND OF THE INVENTION

In plumbing installations, copper tubing is widely employed. In risers, used for connecting tubing to fixtures or tanks, the end of the copper tubing is shaped to form a bulb sealing surface and such bulb includes a shoulder permitting the tubing and thus the bulb sealing surface to be drawn into biting or sealing engagement with the fixture. The cost of such copper tubing and the cost of forming the same to permit the connection to such fixtures or tanks is substantial.

More recently, polybutylene was approved for use in plumbing. Tubing or pipe made of polybutylene is normally joined by heat-fusion techniques, by mechanical compression, and by cold flaring. In order to provide such polybutylene tubing with a bulb sealing surface or an end cap for such purposes, a variety of techniques have been employed. Two commonly employed techniques are: (1) spin-welding a separately molded bulb onto the outer diameter (O.D.) of the end of a tube; or (2) insert molding a bulb onto the O.D. of the end of a tube. All such processes have cost and performance drawbacks. Most require separately molded parts which must be joined to the tubing in assembly operations. Moreover, a two-part tubing end cap or bulb sealing construction does not have the performance integrity or the expected useful life of the tubing itself. In the spin welding technique, excessive clamping pressures may cause the loaded part to become dislodged or separated from the O.D. of the tubing and the interface of the parts provides a possibility of leakage. In the case of a neoprene or like washer employed on the O.D. of the tubing, the same interface leakage susceptibility is present. Moreover, a flange formed to receive the washer may itself create a point of weakness if excessive clamping pressures are employed. Further neoprene washers are known to deteriorate with age and temperature exposure. Lastly, insert molding forces hot material over a cold tube surface, which can separate from the tube.

The solution to this problem of providing polybutylene tubing with an attached bulb sealing surface of unitary construction is detailed in U.S. Pat. Nos. 4,316,870, 4,446,084 and 4,525,136, which are hereinby incorporated fully by reference. The thrust of these references however, is to teach the ability to maintain a constant diameter opening within the tubing, while the wall thickness is variable. This is of necessity, due to the configuration of the mold cavity, and insertion of the mandril inside the tubing during the processing steps.

A corresponding associated problem with the formation of the above-described male end of the polybutylene tubing, is the ability to bell an opposed end of the tubing, without any accompanying wall thickness compromise, which would make the product unsuitable for all plumbing applications, for which polybutylene has been approved, provided that a wall thickness can be maintained at 0.062"+0.010", as defined by ASTM 3309. In particular, it is desirable to use ⅜" O.D. polybutylene tubing with wall thickness of 1/16" (0.062") and subsequently insert a ½" CTS (copper tube size) fitting of nominal 0.501" O.D. The only way this can be achieved is through belling one end of the tubing from ⅜" O.D. (¼" I.D.) to ⅝" O.D. (½" I.D.). While it is possible to use ⅝" O.D. tubing to start, this uses more raw materials than necessary.

Prior art solutions to the formation of a bell on one end of polybutylene tubing is by heating a portion of the end of the tubing, followed by insertion of a mandril into the heated open end, the O.D. of the mandril being matched to the targeted inner diameter (I.D.) of the tubing. While this approach will bell the tubing, it is incapable of reproducibly making tubing product with a constant wall thickness of 0.062"+0.010" throughout the belled end, particularly in the neck region of the bell. This is due to the fact that the bell is made by expanding the I.D. and thus thinning the walls. A solution fact that the bell is made by expanding the I.D. and thus thinning the walls. A solution to this problem is found in pending U.S. patent application Ser. No. 08/327,028.

The trend today however, is to shift from thermoplastic materials, e.g., polypropylene, polybutylene, etc., to thermoset materials, e.g., crosslinked polyethylene. However, this shift in materials is not simple in that there are several processing changes which must be incorporated in order to fabricate acceptable parts. Since thermosets cannot be extruded like thermoplastics, differing processing conditions must be employed in different sequences in order to achieve similar functionality for the product. For example, it is not possible to simply take a crosslinked polyethylene tube and mold it into a bulb end by taking the polybutylene technology taught in the prior art. Previously crosslinked material will not chemically bond to itself even when heated to the clear state. This means that the material in the formed ends is not completely sealed upon itself, but rather molded in place with pressure. One prior art solution to this problem is the use of metal inserts which are positioned into crosslinked polyethylene tubes and subsequently crimped in order to achieve a fitting. This is an inherent weak spot in the final product, and the industry has long sought to find a solution to the problem of developing a one-piece plumbing part made out of a thermoset plastic.

SUMMARY OF THE INVENTION

In accordance with the present invention, there is provided a method for processing polymers which will enable a work piece to have one-piece formed/shaped ends from a single piece of tubing.

It is an object of this invention to provide a process for belling a tube of initial internal diameter to a larger internal diameter while maintaining at least a constant wall thickness throughout the tubing to produce a thermoset plastic part.

It is another object of this invention to provide a process for forming a sealing surface shaped end on a thermoset tube wherein the shaping results in a thermally bonded end of constant internal diameter, the part having been formed from a polyethylene tube which in one embodiment of the invention is crosslinked subsequent to the formation of the fabricated end.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Referring now to the drawings wherein the showings are for purposes of illustrating the preferred embodiment of the invention only and not for purposes of limiting the same, the Figures show cut lengths of plastic tubing upon which various end configurations have ben incorporated onto.

As seen in the figures, the tubing comprises a top vertically fixed mold (10) and a vertically movable bottom mold (11). The top mold or die (10) includes a central bore (12) and a riser tube (13) secured to the top thereof having an I.D. the same as the I.D. of the bore (12). The lower surface of the top mold is provided with a cylindrical projection (14) projecting centrally therefrom. The lower end of the bore is provided with a conical flaring portion (15), the lower end of which is provided with a small radius seen at (16). Radially beyond such radius, the bore is terminated in an axially extending edge (18).

The bottom mold (11) includes a body (20) which may include an annular passage (21) for the circulation of cooling medium therethrough. The body (20) is threadedly connected to rod (22) of a piston-cylinder assembly and adjustably locked thereto by the nut (23). The top of the mold or die (11) is provided with a central recess shown generally at (25) which includes an upper cylindrical portion (26) into which the axial projection (14) of the top mold is designed closely to telescope. The lower end of the cylindrical portion is provided with a shoulder (27) separating the cylindrical portion of the recess from circular bulb forming cavity (28a) or belling cavity (28). The lower circular bulb forming cavity is provided with a horizontal circular axially facing end face (29) which is selectively larger in diameter than the diameter of the bore (12). Projecting axially from the bottom of the recess (25) is a guide rod (30), the top of which is provided with a pilot nose or pointed portion (31).

Figures 1, 2, 3:
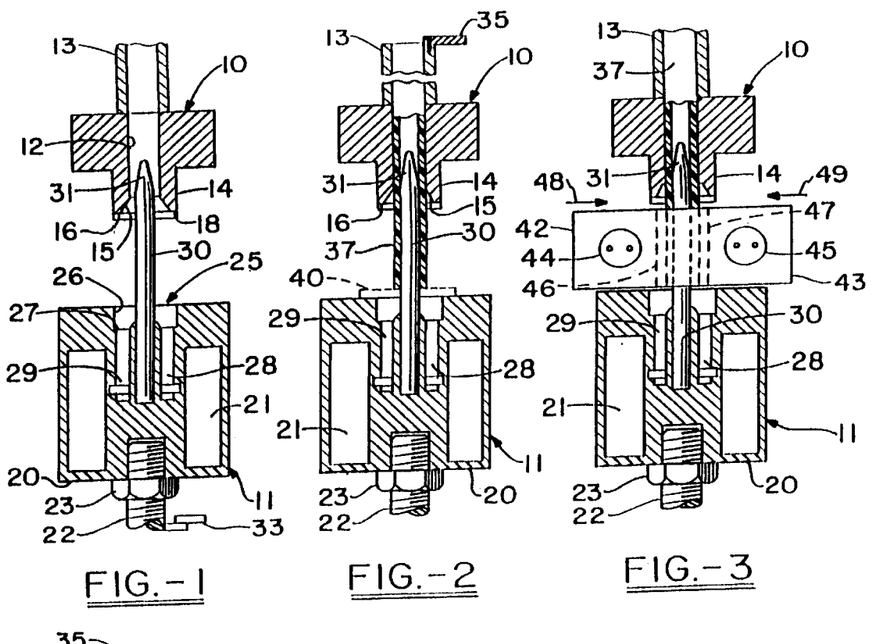
FIG. 1 is a fragmentary vertical section of the dies employed to form the tubing in accordance with the present invention, such dies being shown separated from each other.
FIG. 2 is a view similar to FIG. 1 showing the tubing inserted through the female die, partially inserted on the male die and projection a predetermined distance from the former.
FIG. 3 is a view similar to FIGS. 1 and 2 showing the tube projection portion being heated.
Figure 20:
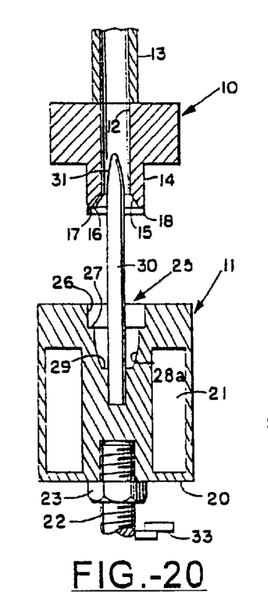
FIG. 20 is a fragmentary vertical section of the dies employed to form the sealing end of the tubing in accordance with the present invention, such dies being shown separated from each other.

In FIGS. 1 and 20, the top and bottom molds or dies have been brought to an intermediate position relative to each other in that the bottom mold (11) has been brought to an intermediate elevated position and the position may be determined by a retractable adjustable stop as seen at (33) in FIG. 1. In such position, the pilot nose of the guide rod (30) projects into the bore (12) as shown.

Figure 21:
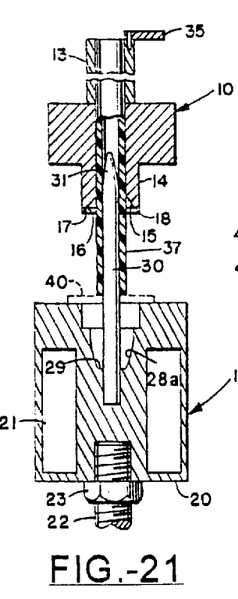
FIG. 21 is a view similar to FIG. 20 showing the tubing inserted through the female die, partially inserted on the male die and projection a predetermined distance from the former.
Figure 22:
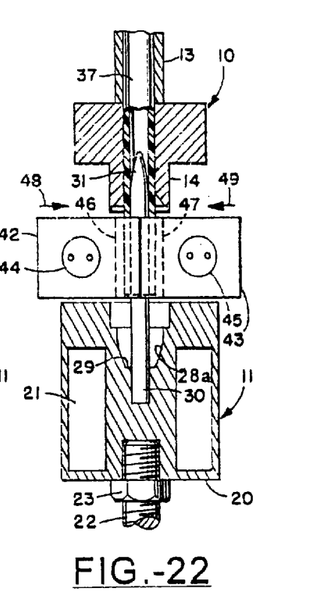
FIG. 22 is a view similar to FIGS. 20 and 21 showing the tube projection portion being heated.

Referring to FIGS. 2 and 21, it will be seen that the top of the guide tube (13) is provided with a back stop seen at (35) which may be pivoted to the top of the guide tube (13) for swinging movement to and from a position clear of the I.D. of such tube or over the I.D. of such tube.

An extruded polyolefin plastic tube section, which may or may not be crosslinked at this point in the fabrication, cut to a predetermined length, is now inserted downwardly through the guide tube as seen at (37) to project from the lower end of the top mold (10). The dimensions of the tube O.D. and I.D. are such that the tube will fit snugly in the I.D. of the bore (12) with the I.D. of the tube fitting snugly over the O.D. of the rod (30). It is important that the tube (37) project a predetermined distance below the top mold (10). This predetermined distance can be obtained in several ways. When the operator inserts the tube, the operator can insure that the top of the tube is flush with the top of the guide tube (13) and pivoting the back stop (35) over the top of the tube gages the tube against such back stop. In this manner, the tube length may be gaged from the top end to project the predetermined distance noted. Alternatively, a gage bar, shown at (40) may be employed to contact the lower end of the tube to obtain the desired projection.

With the molds still in their intermediate position and the tube properly positioned and projecting from the top mold, the projecting end of the tube is now heated as seen in FIG. 3. The heating of the tube may be accomplished in a variety of ways. In FIG. 3, two heating blocks (42) and (43) are employed, each provided with electrical heating elements seen at (44) and (45), respectively, to confine the projecting end of the tube (37) therebetween. It will of course be appreciated that other forms of application of heat may be employed such as sonics or a heating jacket employing oil or other heating medium.

The projecting end of the tube is heated for a predetermined length of time so that the projecting end of the tube is heated short of a complete melt, but sufficiently to make the material pliable enough to mold when the dies are brought together. While those skilled in the art are familiar with the temperatures described in this operation (e.g., 600°–900° F.), for illustrative purposes only, this temperature would be approximately 700° F.±25° F. for a time of between 10–30 seconds in the case of polypropylene, and approximately 700±25° F. for a time between 15–35 seconds for crosslinked polyethylene. The key is to balance temperature and dwell time within the heating blocks. It is well within the skill of those in the art to vary the time and/or temperatures noted to achieve the desired degree of "softness" necessary for further processing.

Figures 4, 5:
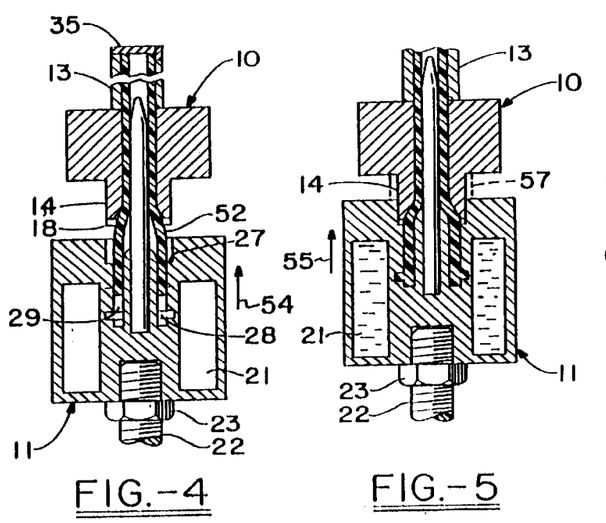
FIG. 4 is a view similar to FIGS. 1–3 showing the dies being brought together.
FIG. 5 is a view similar to FIG. 4 showing the dies closed.
Figure 23:
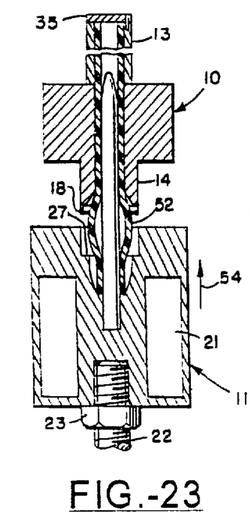
FIG. 23 is a view similar to FIGS. 20–22 showing the dies being brought together.
Figure 24:
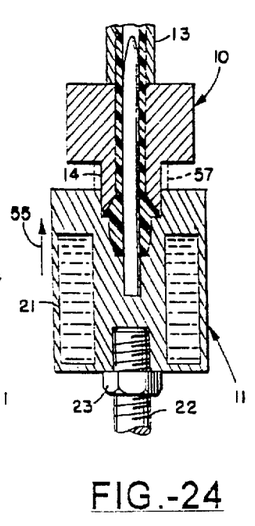
FIG. 24 a view similar to FIG. 23 showing the dies closed.

After the desired amount of heat is applied, the heating blocks are removed. Depending upon the polymer and/or time and/or temperatures used, a cooling cycle may be employed before the initiation of the next step. If a bottom gage is employed, the gage (40) is also removed and the retractable step (33) is withdrawn. With the back stop (35) in place, the piston-cylinder assembly of the rod (22) is now further extended as seen in FIGS. 4 and 23 and the projecting end of the tube seats in the bottom face (29) of the bulb forming cavity (28) and begins to form as seen at (52). As the bottom mold (11) moves upwardly as indicated by the arrows (54) and (55) in FIGS. 4 and 5, and FIGS. 23 and 24, respectively, the axial projection (14) of the top mold telescopes within the cylindrical recess (26) of the bottom mold. The bottom mold continues upwardly to the position shown in FIGS. 5 and 24, forming the tube end as indicated. During such movement, the back stop (35) keeps the tube from moving upwardly with respect to the top mold. The piston-cylinder assembly is filly extended until the edge (18) of the top mold engages the shoulder (27). Such edge will tend to bite off or render easily removable any flash formed between the telescoping surfaces of the molds. Alternatively, a stop or gage ring can be provided as seen at (57) to limit the relative movement of the molds to avoid wear on the edge (18). When the molds are fully together as seen in FIGS. 5 and 24, a cooling medium may be circulated through the passage (21) as seen at (58). While water is preferred, it will be appreciated that the cooling medium could be many other fluids such as oil or a gas.

After the mold has been cooled for a predetermined time, the piston-cylinder assembly of the rod (22) is fully retracted and the top mold may be indexed horizontally so that the now formed tube may be removed. If any flash appears, it can readily be removed from the tube. While the discussion has focused on the top mold being of unitary construction, it is equally envisioned that a split mold could be employed. In this embodiment, and the piston-cylinder assembly is fully retracted, the split halves of top mold (10) would be opened and the part removed from the top mold in a vertical direction.

After the tube is removed, the top mold remains in alignment with the bottom mold and the stop (33) is returned to its position and the piston-cylinder assembly is extended to bring the molds back to the original FIGS. 1 or 20 position so that the process may be repeated.

It will be appreciated that the tooling illustrated may be either horizontally or vertically oriented and that the recess configurations may be readily altered to form a belled end of varying configurations. Also, the tube holder (13) can be readily changed to accommodate tubes precut to different lengths. In practicing the process, it is important however, that the projecting heated end of the tube substantially conform to the volume of the mating recesses in the two dies or molds. Whether employed horizontally or vertically, the relatively fixed mold (10) may be termed the female mold while the moving mold (11) with the guide rod projecting therefrom and holding the I.D. of the tube may be termed the male mold or die.

Figure 6:
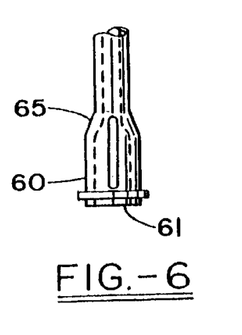
FIG. 6 is a fragmentary elevation of the end of the tube as formed by the process depicted in FIGS. 1–5.

The resultant product of the process of FIGS. 1–5 is seen in FIG. 6. The plastic tube thus formed includes an integrally formed belled end into which a suitably dimensioned copper fitting for example, could be inserted. The plastic tube thus formed, includes an integrally formed belled surface (60) extending from the end face (61) of the tube to conical neck (65). The end face (61) of the tube has both a larger I.D. and O.D. than the remainder of the tube, but the thickness of all portions of the tube are the same.

Figure 11:
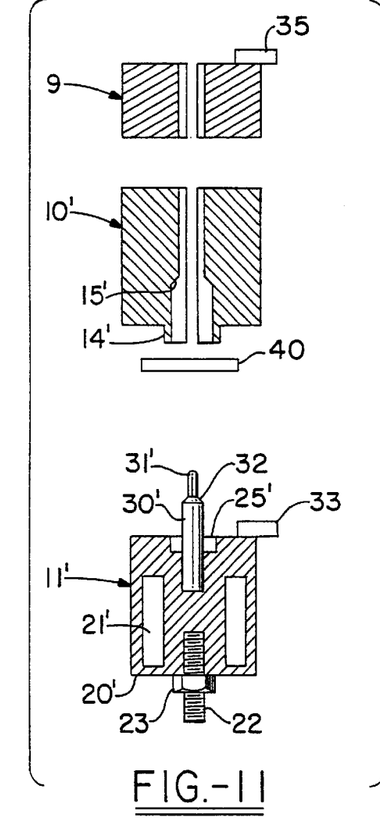
FIG. 11 is a fragmentary vertical section of the dies employed to form the tubing in accordance with the present invention, the dies being shown separated from each other

As shown in FIG. 11, alternative mold designs are envisioned equally applicable to the process described previously. In discussing this alternative embodiment, like part numbers are referred to using the same reference numerals described previously. Similar, but modified parts are designated by the inclusion of a prime (') after the reference numeral. The device includes a top vertically moveable two-piece horizontally operating clamping die (9), a center vertically-fixed two-piece horizontally operating mold (10') and a vertically moveable bottom mold (11') . The clamping die (9) includes a central bore, the diameter of which is equal to a diameter sufficiently smaller than the diameter of the tube to be belled so as to cause a clamping effect on the tube when the clamp die (9) is closed.

The center vertically-fixed two-piece horizontally operating mold (10') includes a central bore, of the same diameter as the tube to be belled. The lower end of the bore is provided with a conical flaring portion (15), the lower end of which is of a diameter and length equal to the outside diameter and length of the belled end of the tube.

The bottom mold (11') includes a body (20) which may include an annular passage (21) for the circulation of a cooling medium therethrough. The body is threadedly connected to rod (22) of a piston-cylinder assembly and adjustably locked thereto by nut (23). The bottom mold or die (11') is provided with a central recess shown generally at (25) into which the axial projection (14') of the top mold (10') is designed closely to telescope. Projecting from the bottom of the recess (25') is rod (30'), the diameter of the rod at the bottom of the recess of equal diameter to the I.D. of the belled end of the tube and maintained for a distance equal to the depth of the tube bell. Rod (30') terminates at top (31') and is radiused to corresponding conical flaring portion (15) at conical segment (32).

Figure 12:
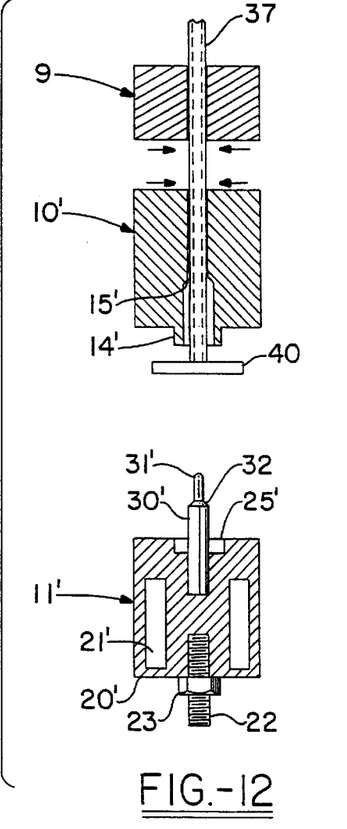
FIG. 12 is a view similar to FIG. 11 showing the tubing inserted through the female die, and projecting a predetermined length therefrom.

In sequenced operation and shown in successive figures, this modified mold and die design is identical in concept, and implementation to that previously detailed and all related discussion is equally applicable to either embodiment. As shown in FIG. 12, plastic (37) is inserted through clamping mold (9) and top mold (10'), resting on tube position stop (40). The two halves of the clamping mold (9) are closed thereby holding plastic (37) firm.

Figure 13:
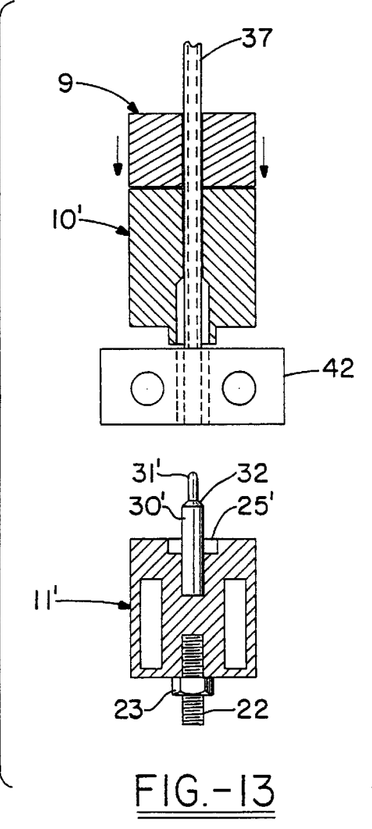
FIG. 13 is a view similar to FIGS. 11 and 12 showing the tube projection portion being heated.

In FIG. 13, clamping mold (9) is moved to a position extending the lower end of the plastic (37) into a cavity in heating blocks (42). The split halves of center mold (10') are closed about the circumference of plastic body (37) during the heating cycle to provide stability to the tube during the heating cycle.

Figure 14:
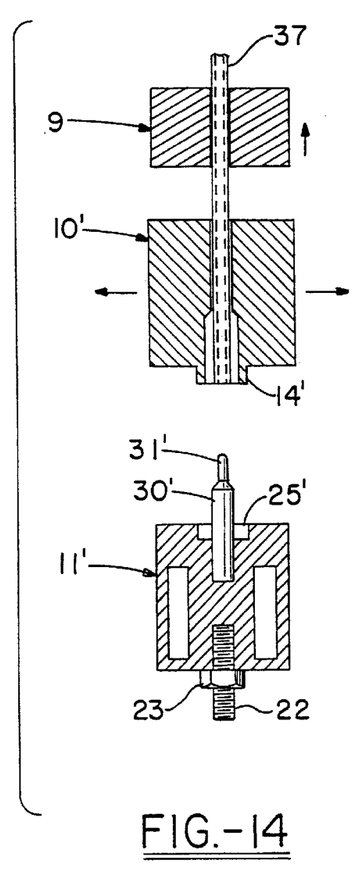
FIG. 14 is a view similar to FIGS. 11–13 showing the clamping die retracting the projecting tubing portion back into the middle die for subsequent belling.
Figure 15:
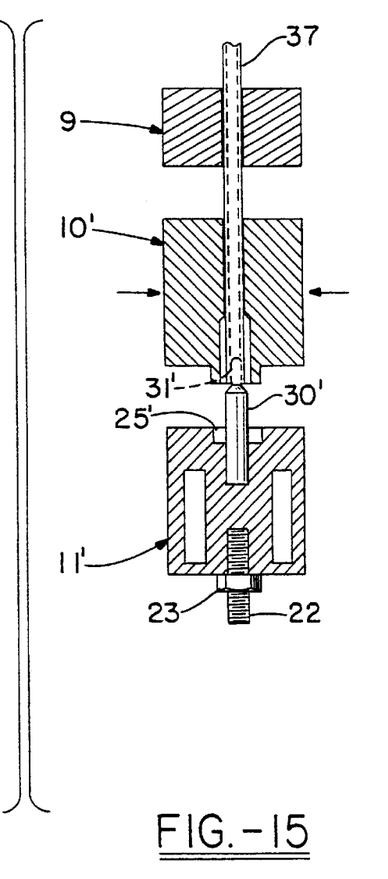
FIG. 15 is a view similar to FIGS. 11–14 showing the dies being brought together.

With the heating cycle completed, center mold (10') is opened and clamping mold (9) returned to its original disengaged position. The heated end of plastic (37) is now positioned in the belled cavity of center mold (10') as shown in FIG. 14. In FIG. 15, the center mold (10') has been closed about plastic (37) and bottom mold (11') moved upward with the pilot nose (31') of guide rod (30') penetrating the heated end of the tube.

Figure 16:
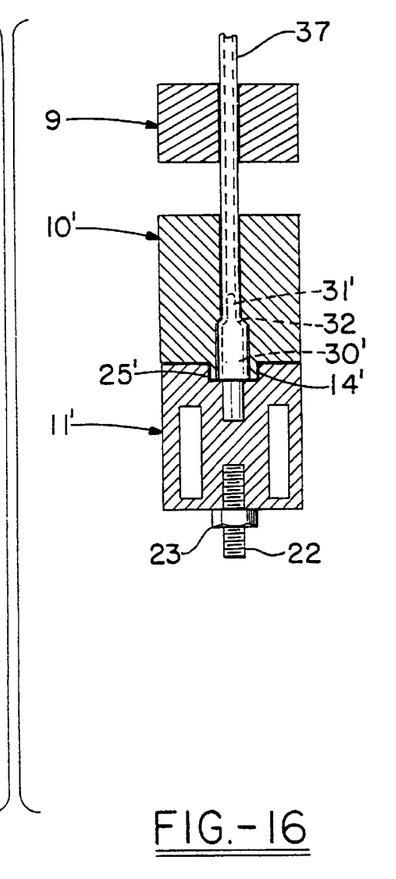
FIG. 16 is a view similar to FIGS. 11–15 showing the dies closed.

In FIG. 16, bottom mold (11') is completely extended, forcing the heated plastic into the cavity created at the connection center mold (10') and bottom mold (11'). After a sufficient period of cooling, all molds are returned to their original positions and the belled tube is then removed from the molds.

Figures 7, 8:
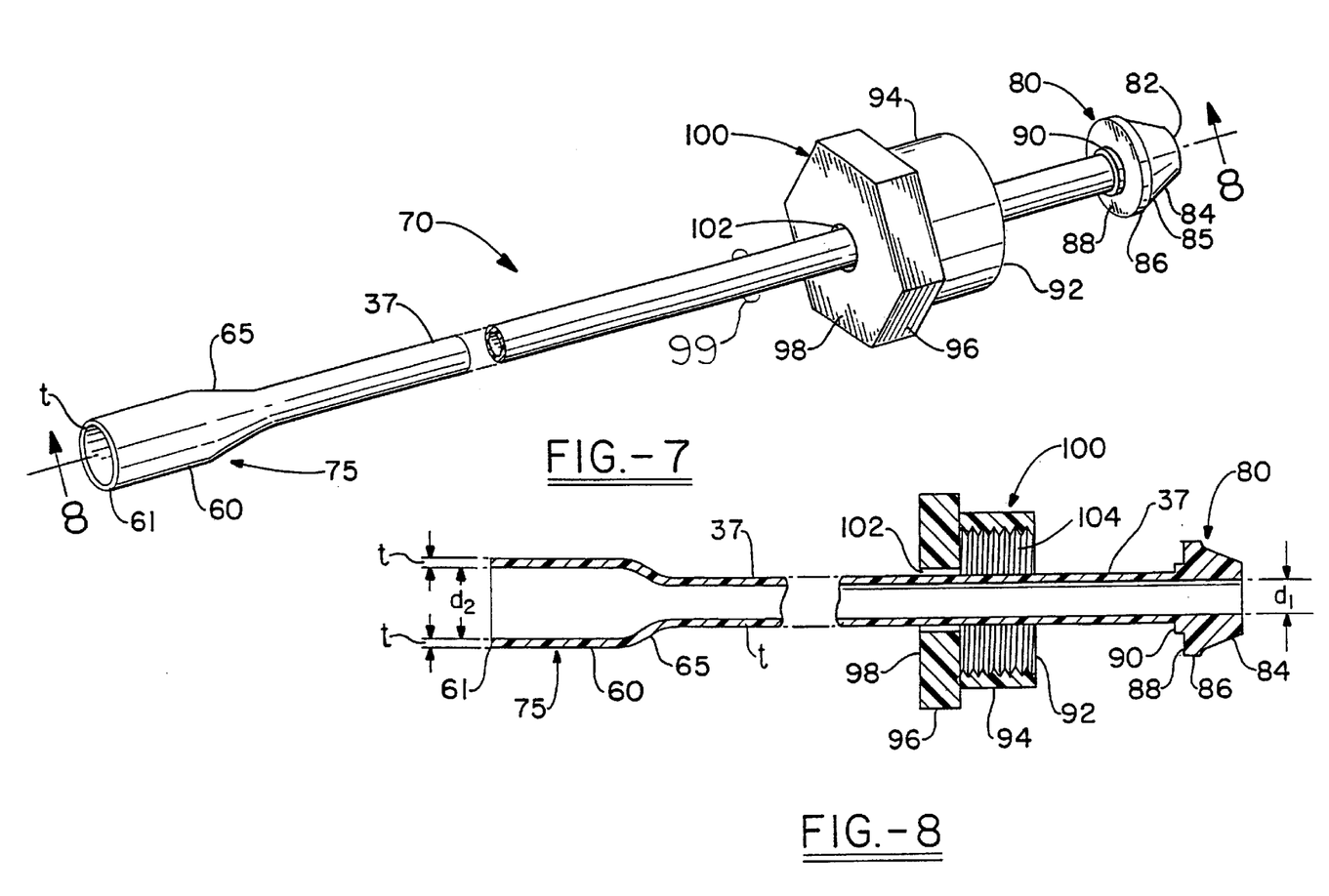
FIG. 7 is a perspective view showing the male and female segment of a section of tubing made in accordance with the teachings of this invention, wherein the male segment is an integrally molded bulb and sealing surface and the female segment is shown belled to a larger diameter, the thickness of the tubing being constant throughout, with internally threaded nut shown slightly below the male segment.
FIG. 8 is an enlarged cross-sectional view taken along line 8—8 of FIG. 7.

FIG. 7 illustrates one embodiment of a completed plumbing connector (70) comprising a unitary molded end cap (80), nut (100), and belled end (75). The length of connector (70) is of any length, and configuration. It may be straight or contain a myriad of bends and twists. What is critical however, is that subsequent to the formation of the end cap (80), the nut (100) is positioned onto the connector with the open face (92) of nut (100) facing toward end cap (80). It is not possible to insert nut (100) subsequent to the belling step described previously.

Unitary molded end cap (80) comprises a belled sealing surface (84) extending from the end face (82) of the tube to radially extending flange (86). The sealing surface (84) may be radiused as indicated or it may be conical. The end face (82) of the tube has a slightly larger O.D. than the remainder of the tube so that the wall of the tube at the sealing surface is substantially enlarged throughout its length. The sealing surface terminates in the flange (86) which includes a stop face (85) adjacent the sealing surface and a shoulder (88) on the opposite side. From the shoulder to the O.D. of the tube, there is provided a fillet (90) which joins the flange spaced from the peripheral edge thereof with either a slight radius (65) as shown in FIG. 6 or a collar (90) as shown in FIG. 7.

Nut (100), which is inserted prior to the belling step, and after the formation of unitary molded end cap (80), is positioned onto connector (70) of diameter $(d_1)$ through nut opening (102) which is of larger diameter than $(d_1)$, but of smaller diameter than shoulder (86), with open face (92) positioned toward end cap (80). Nut (100) contains a threaded circular bore (104) of predetermined height (94) which is used to sealingly engage a mating threaded receiver (not shown). As nut (100) is tightened by a plurality of parallel-spaced ridges (96), end cap (80) is brought into leak-proof engagement with the threaded receiver by the top surface (98) of nut (100), through its engagement onto shoulder (88) of end cap (80) as best shown in FIG. 8. In one embodiment of this invention, shown only in FIG. 7, retaining ridges (99) are compression molded into the shaft of the tube, serving the purpose of retaining the nut (100) close to the molded end cap (80). Due to the flexible nature of the thermoplastic starting material, nut (100) is capable of being inserted over the retaining ridges (99) by the application of a slight pressure. The precise positioning of the retaining ridges is not critical, but generally is in close proximity to the sealing end of the tube. The ridges are molded into the tubing design through a simple modification of the mold design used to fabricate the sealing end. The number of retaining ridges can be variable, being at least one, preferably at least two opposed nodules on the shaft of the tube. Higher number of retaining ridges are also envisioned within the scope of this invention, the number being dependent upon both cost and geometric space considerations.

Connector (70) is thus, of unitary construction, of original diameter $(d_1)$ and thickness (t), which through the process of heating and molding into an appropriately configured die, is shaped into end cap (80), still of diameter $(d_1)$. After insertion of nut (100), and subsequent heating of an opposed end to end cap (80) of connector (70), followed by molding into a second appropriately configured die, belled end (75) is fabricated of larger diameter $(d_2)$, but still of thickness (t).

Figures 9, 10:
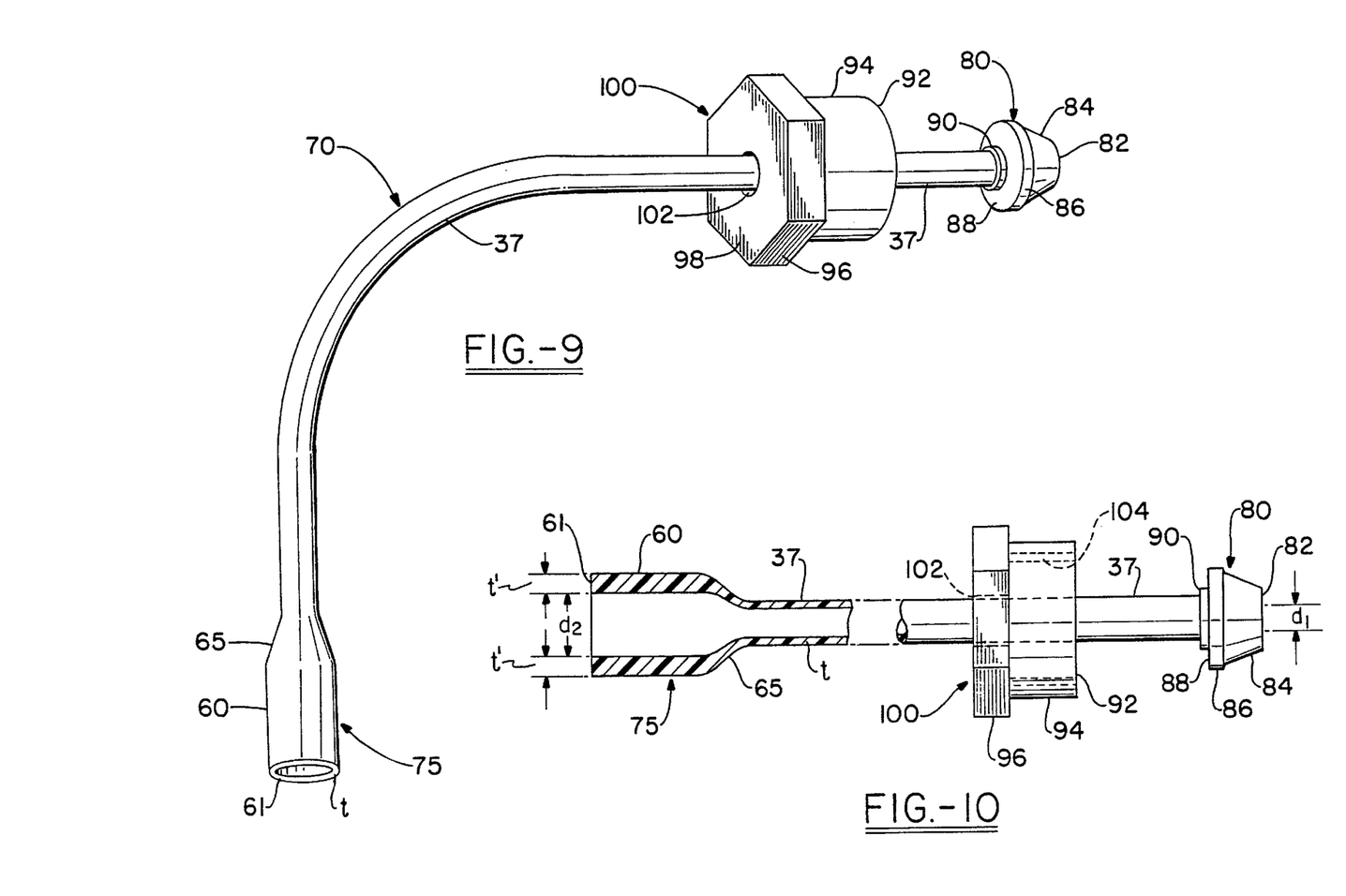
FIG. 9 is a perspective view showing the tubing of FIG. 7 illustrating a non-linear configuration of the tubing.
FIG. 10 is an enlarged cross-sectional view similar to FIG. 8 illustrating an increased thickness of the tubing in the belled region.

As shown in FIG. 9, the plumbing connector (70) need not be in a linear configuration along a longitudinal axis of the connector. In fact, non-linear configurations are well-within the scope of the invention. Such bends within the connector can be: (1) permanent, the result of post fabrication techniques, such as mild, fairly localized heating to a softening point of the material, followed by bending and molding within a fixture that will hold the desired angle and radius, followed by cooling, and other processes which are known-in-the-art; or (2) non-permanent.

While the plumbing connector wall thickness (t), has been shown to be the same throughout, the application is not necessarily limited to such. As shown in FIG. 10, it is possible to fabricate plumbing connector (70) wherein the wall thickness (t'), is greater than that of the mid-portion of tube (37). In other words, (t')>(t). Such a configuration is made by increasing the thickness of the die cavity containing circular bulb forming cavity (28). As discussed previously in relation to a constant wall thickness (t), thickness (t') will require that tube (37) project an even longer distance below top mold (10) than used when thickness t is desired. This is necessary such that subsequent to the softening of the projecting end of tube (37) via the action of heating blocks (42) and (43), or other heating means, and the dies have been brought together, the larger die void, i.e., bulb forming cavity (28) will be filled with polyolefin.

While unitary molded end cap (80) has been previously prepared in accordance with the mold design shown in U.S.

Figure 17:
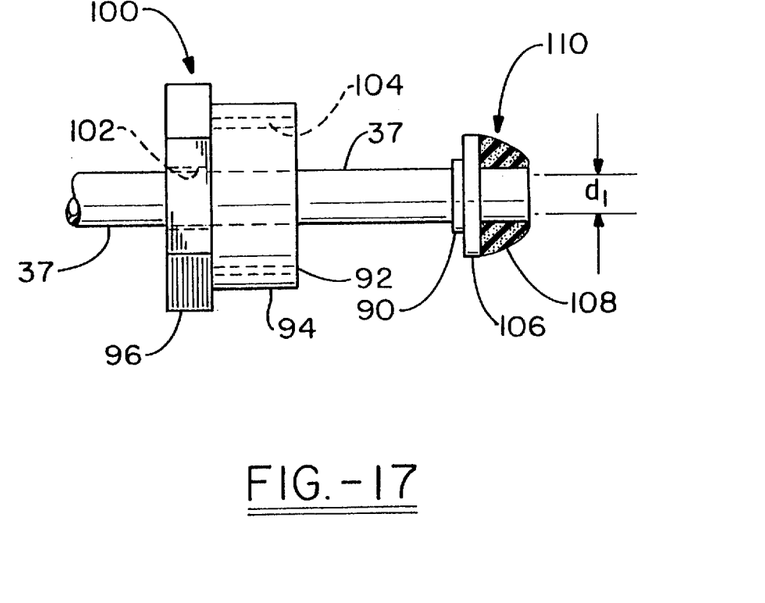
FIG. 17 is a perspective view showing the male and female segment of a section of tubing made in accordance with the teachings of this invention, wherein the male segment is an integrally molded ledge with a soft nose cone sealing surface and the female segment is shown belled to a larger diameter, the thickness of the tubing being constant throughout, with internally threaded nut shown slightly below the male segment.

Pat. No. 4,316,870, U.S. Pat. No. 4,446,084 and U.S. Pat. No. 4,525,136, it is not limited in shape to such. It should be recognized that while a molded end cap such as that shown in FIGS. 7–10 may be highly desirable when using polybutylene, crosslinked polyethylene can be significantly harder and more rigid, or softer and more flexible, and does possess different sealing characteristics. In some instances, i.e., an alternative embodiment, it is preferable to switch to a different mold design for the molded end cap, such as to produce a tubing end (110) as shown in FIG. 17, wherein a constant diametered ($d_1$) tube is shown having a tubing wall thickness (t) and a nose cone shelf (106) projecting essentially normal to the longitudinal axis of the tubing as shown. The sealing bulb (108), shown in cross-section, is a separate insert which seats itself onto one side of the nose cone shelf (106) and is typically made of a rubber polymer (e.g., EPDM, neoprene, TPR, TPE, etc.) which is softer than crosslinked polyethylene.

Figure 18:
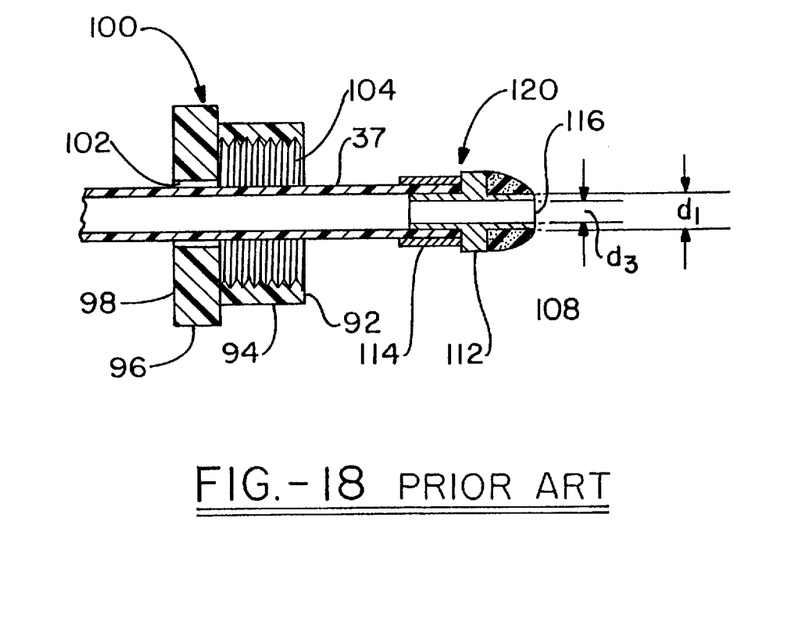
FIG. 18 is an enlarged cross-sectional view of a prior art tubing connector.

The tubing end shown in FIG. 17 is distinct when contrasted to the design which the Prior Art has been using when crosslinked polyethylene is the tubing material as shown in FIG. 18. The nose cone shelf (1 12) is actually a component of a metal insert (116) which is held into place via metallic or plastic ring (114) which is compression fit (crimped) or shrunk onto the exterior of the tube. The metal insert (116) is of diameter ($d_3$) which is of slightly smaller I.D. than the original tube I.D. ($d_2$). This Prior Art product inherently is weaker than a molded end cap as any crimped fitting potentially can separate leading to field failure.

Figure 19:
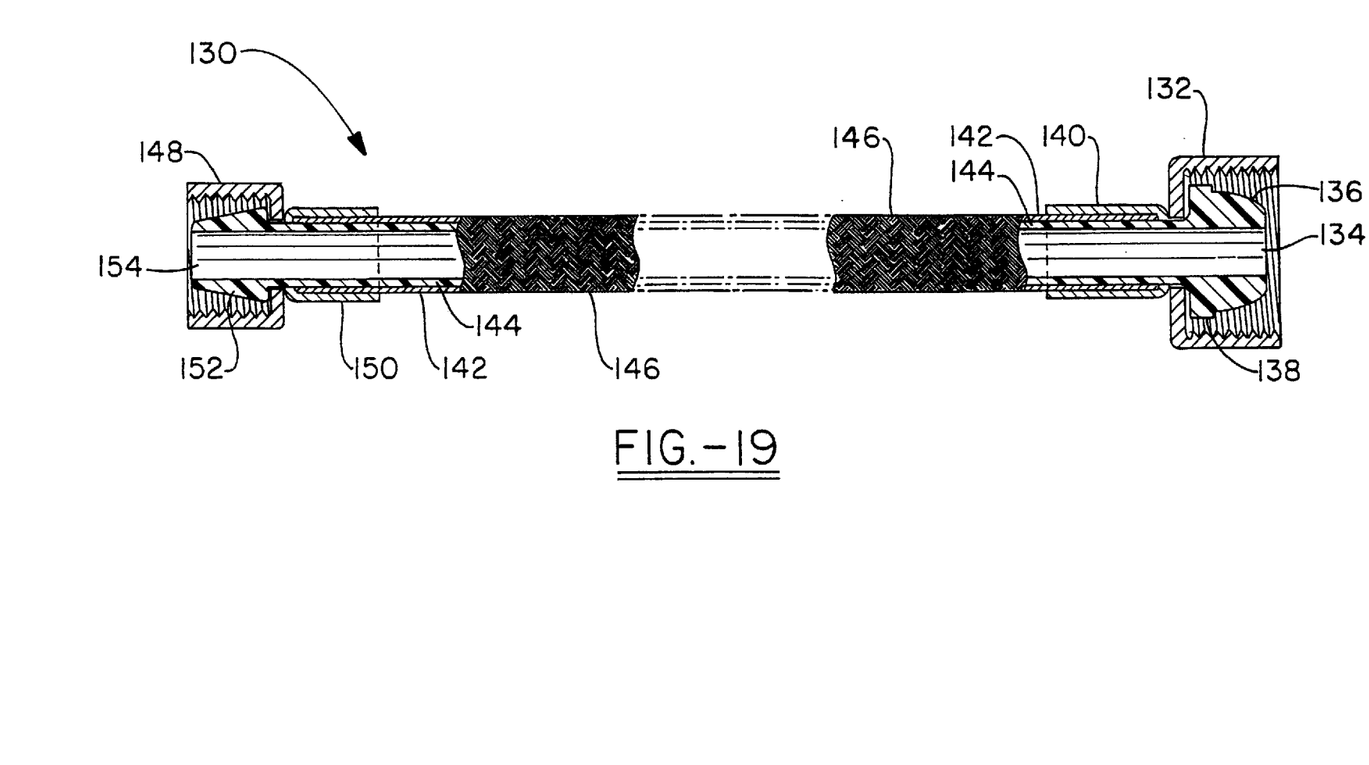
FIG. 19 is a side view shown in partial cross-section showing a tubing connector having both a radiused and a conical sealing means with a stainless steel overbraid.
Figure 25:
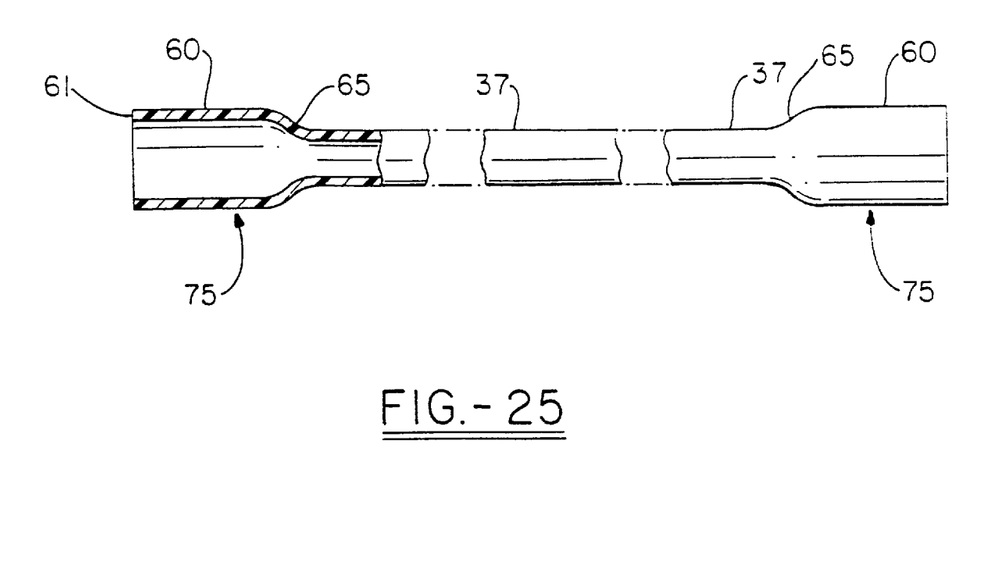
FIG. 25 is an enlarged partial cross-sectional view of a connector having two belled ends.

While the tubing connectors have generally been shown having one molded end and one belled end, there is no need to limit the invention to such. In fact, depending upon the intended application, it may be highly desirable to have two molded ends (130) as shown in FIG. 19 or two belled ends as shown in FIG. 25. Connector (130) is an example of a connector with two molded ends (134, 154), one end being conical (136) and having a shelf(138) with the other end being radiused (152). The connector is of a multilayered construction having an internal crosslinked thermoplastic layer (142), with a stainless steel overbraid layer (116), attached to the conical end via metallic ring (140) and to the radiused end by metallic ring (150). Each end further contains an attachment means (132, 148), in this example, being a threadably engagable nut.

Depending on the equipment available, the polyolefin (e.g., polyethylene) tubing is crosslinked using conventional means known to those skilled in the art (e.g., silane, radiation, etc.). The material is typically crosslinked to at least 60%, with amounts as high as 85% being possible. Cost usually decides which crosslinking method needs to be used to provide a given quality of tubing. The benefit of crosslinking the polyethylene subsequent to the fabrication steps described in the application is that a chemical material bond is formed during the end-forming compression molding processes, resulting in a stronger product. However, there may be applications where this type of end-forming is not essential, thereby permitting the use of previously crosslinked material during the fabrication procedure. Previously crosslinked material has a much better hot melt strength since the crosslinking gives it more structure, and making forming easier. However, the crosslinked material will not chemically bond to itself even when heated to the clear state. This does mean that the material in the formed ends is not completely sealed upon itself, but molded in place with pressure.

Crosslinking can of course, be accomplished in many different ways. Most crosslinking is done in the extrusion process, specifically by the Engel process, the silane process or the peroxide process. Each process has a crosslinking catalyst that causes the polymer to crosslink when certain temperature and pressure are used. One additional way to crosslink is to use radiation. In this method, extruded tubes are passed under a radiation unit and the exposure causes crosslinking. It usually is more economical to radiate straight tubes since the economics revolve around how many parts will fit on a cart that rolls under the beam. However, this does not represent the only embodiment contemplated within the invention. It is envisioned that under some circumstances, it would be appropriate to crosslink the final product. While the sequencing of the above mentioned processing steps is generally not critical, certain aspects do need to be performed in sequence, e.g., the belling and flaring sequences discussed previously in this application. Depending upon the physical strength and integrity of the final product, the steps of crosslinking, belling, and/or flaring can be effected in any sequence, the only limitation being that the insertion of a nut be effected prior to the completion of both the belling and flaring fabrication processing. A similar limitation would also be present when the tubing work piece is to have two sealing surfaces on opposed ends. The insertion of the nut would need to precede the fabrication of the second sealing end.

DISCUSSION

What has been described is a thermoset rather than a thermoplastic tube which has a much higher heat distortion temperature when compared to standard thermoplastic materials such as polybutylene, polypropylene, polyethylene, ABS or PVC. The stress crack resistance is higher as is the dimensional stability. These desirable properties can be achieved by using a lower cost material, in contrast to a more expensive thermoplastic.

Through the processing described above, a superior product can be fabricated at a lower price than that possible using a standard thermoset, which could not have ben processed in a similar manner (thermosets cannot be extruded). The invention utilizes thermoplastic processing conditions, with subsequent crosslinking to form a thermoset. This combines the best features of both types of materials: (1) the ease of thermoplastic processing; combined with (2) the desirable physical properties of a thermoset. One of the biggest advantages with the use of crosslinked polyethylene is the fact that it is not notch sensitive, a physical property of large concern when using polybutylene.

Other significant advantages associated with the use of crosslinked polyethylene when compared to polybutylene lie in the fact that crosslinked polyethylene is not a crystalline material. Polybutylene for example requires seven days after extrusion to crystallize and molded ends cannot be formed until this time. Crosslinked polyethylene can be formed immediately. The crosslinked polyethylene has a higher heat distortion temperature and since it is at least 60% crosslinked, cannot be used as regrind material. There is a significant memory effect associated with crosslinked polyethylene and the material always goes back to its original shape when it was crosslinked. The PEX can be lower density polyethylene and when crosslinked, will result in a softer, more flexible tube. PEX is also a more forgiving material to fabricate ends with, in that it is possible to form in radii and subsequently fabricate.

Thus, what is shown in this application is that through process modifications, the limitations inherent in polyethylene, polypropylene, and polybutylene have been overcome. Polyethylene is a low cost product that is easy to process, but suffers from low temperature resistance, low burst strength and poor creep resistance. It does have good flexibility. Polypropylene is of moderate cost and also is easy to process. It however, has poor cold weather impact, poor creep resistance, poor burst strength and poor flexibility. Polybutylene is high cost and difficult to process, but has good cold weather impact, good creep, good burst strength, but suffers from poor flexibility.

By working with a medium density polyethylene, which is of low cost easy processing, good flexibility, but marginal cold impact and poor burst, and crosslinking the material to over 65%, the resulting product possesses good creep, good flexibility, good burst strength, good cold weather impact, significantly lower cost than polybutylene, and with a higher heat distortion temperature with double the life expectancy of polybutylene. The key with forming the ends resides in the processing which occurs when the material is crosslinked, since it becomes a thermoset as opposed to a thermoplastic when it was extruded. In order to overcome this limitation, the molding temperatures were increased due to higher processing temperature, pressure was added because material must be formed over itself, which is pliable, but which does not stick to itself. When the material is crosslinked to 65%, only 35% remains to bond. Scrap is not reprocessable, so operations must be more exact, and the tubing must be constantly checked to be sure that the crosslinking has taken place. The amount of pressure is dependent upon the material which is being processed, the exact number of pounds pressure being varied until the molded product uniformly fills the mold.

By combining the innovation of extruding then radiating, superior properties have been developed at a competitive cost. By combining all of the above, a completely different product is formed which is a thermoset rather than a thermoplastic.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A crosslinked polyethylene connector which comprises:
   a crosslinked tubular segment, said tubular segment comprising
     a first inner diameter,
     a first outer diameter, and
     a tubular segment thickness, said thickness being a difference between the first outer diameter and first inner diameter; and
   at least one integrally molded crosslinked end cap on at least one end of the tubular segment, said end cap having a centrally disposed bore therethrough and comprising an end face,
   a crosslinked sealing means adjacent the end face, wherein the sealing means is selected from the group consisting of a radiused sealing means and a conical sealing means
   a shoulder which terminates the sealing means, and wherein said bore inner diameter is the same as the first inner diameter; and
   wherein a degree of crosslinking of the crosslinked tubular segment and the at least one integrally molded end cap is between 60% and 85% inclusive.

2. The connector of claim 1 which further comprises:
   an overbraid in contact with the tubular segment.

3. The connector of claim 1 which further comprises
   at least one fastening means having
     a centrally disposed aperture therethrough which is larger than the first outer diameter and smaller than a diameter of the shoulder of the end cap; and
     a threaded opening having a diameter which is larger than the shoulder of the end cap.

4. The connector of claim 3 which comprises two end caps and two fastening means interposed between the two end caps.

5. The connector of claim 3 which further comprises:
   an overbraid in contact with the tubular segment.

6. The connector of claim 3 which comprises:
   a belled end on an end on an end of the connector opposite said end cap, said belled end comprising
     a second outer diameter which is larger than the first outer diameter,
     a second inner diameter which is larger than the first inner diameter, and
     a belled end thickness, said thickness being a difference between the second outer diameter and second inner diameter, said belled end thickness being at least as large as the tubular segment thickness.

7. The connector of claim 6 which further comprises:
   an overbraid in contact with the tubular segment.

8. The connector of claim 1 wherein the end cap further comprises
   a flange between the shoulder and sealing means.

9. The connector of claim 8 wherein the end cap further comprises
   a stop face between the sealing means and flange.

10. A crosslinked polyethylene connector which comprises:
    a crosslinked tubular segment, said tubular segment comprising
      a first inner diameter,
      a first outer diameter, and
      a tubular segment thickness, said thickness being a difference between the first outer diameter and first inner diameter; and
    at least one integrally molded seamless crosslinked belled end on one end of the connector, said belled end comprising
      a second outer diameter which is larger than the first outer diameter,
      a second inner diameter which is larger than the first inner diameter, and
      a belled end thickness, said thickness being a difference between the second outer diameter and second inner diameter, said belled end thickness being at least as large as the tubular segment thickness; and
    wherein a degree of crosslinking of the crosslinked tubular segment and the at least one integrally molded belled end is between 60% and 85% inclusive.

11. The connector of claim 10 which further comprises:
    an overbraid in contact with the tubular segment.

12. The connector of claim 10 which comprises two belled ends.

* * * * *